(12) United States Patent
Zhang et al.

(10) Patent No.: US 11,599,004 B2
(45) Date of Patent: Mar. 7, 2023

(54) PRIVACY FILM, DISPLAY APPARATUS, AND METHOD OF DISPLAYING IMAGE IN DISPLAY APPARATUS

(71) Applicants: Chongqing BOE Optoelectronics Technology Co., Ltd., Chongqing (CN); BOE TECHNOLOGY GROUP CO., LTD., Beijing (CN)

(72) Inventors: Jinhong Zhang, Beijing (CN); Wencheng Luo, Beijing (CN); Wei Chen, Beijing (CN); Meilong Hu, Beijing (CN); Wenqi Quan, Beijing (CN); Xinyu Wang, Beijing (CN); Shikang Ge, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 449 days.

(21) Appl. No.: 16/763,690

(22) PCT Filed: Jun. 20, 2019

(86) PCT No.: PCT/CN2019/092044
§ 371 (c)(1),
(2) Date: May 13, 2020

(87) PCT Pub. No.: WO2020/252736
PCT Pub. Date: Dec. 24, 2020

(65) Prior Publication Data
US 2021/0405497 A1    Dec. 30, 2021

(51) Int. Cl.
    *G02F 1/1679*    (2019.01)
(52) U.S. Cl.
    CPC .................. *G02F 1/1679* (2019.01)

(58) Field of Classification Search
    CPC ...... G02F 1/1676; G02F 1/167; G02F 1/1679; G02F 1/1323; G02F 1/13476;
    (Continued)

(56) References Cited

U.S. PATENT DOCUMENTS

| 2016/0334898 A1 | 11/2016 | Kwak et al. |
| 2018/0059450 A1 | 3/2018 | Li |

(Continued)

FOREIGN PATENT DOCUMENTS

| CN | 105549236 A | 5/2016 |
| CN | 106597727 A | 4/2017 |

(Continued)

OTHER PUBLICATIONS

International Search Report & Written Opinion dated Mar. 23, 2020, regarding PCT/CN2019/092044.

*Primary Examiner* — Darryl J Collins
*Assistant Examiner* — Tamara Y. Washington
(74) *Attorney, Agent, or Firm* — Intellectual Valley Law, P.C.

(57) ABSTRACT

A privacy film includes a first conductive layer; an emitting angle limiting spacer layer on the first conductive layer; a second conductive layer on a side of the emitting angle limiting spacer layer away from the first conductive layer; and a plurality of light diffuser particles in a space between the first conductive layer and the second conductive layer. The emitting angle limiting spacer layer includes a plurality of spacers defining a plurality of light emitting regions. The second conductive layer is spaced apart from the first conductive layer by a first distance. A maximum height of the plurality of spacers relative to a surface of the first conductive layer facing the second conductive layer is less than the first distance. The second conductive layer is spaced apart from a surface of a respective one of the plurality of (Continued)

spacers facing the second conductive layer by a second distance.

15 Claims, 6 Drawing Sheets

(58) Field of Classification Search
CPC .......... G02F 1/13362; G02F 1/133305; G02F 1/1334; G02F 1/1339; G02F 1/13439
See application file for complete search history.

(56) References Cited

U.S. PATENT DOCUMENTS

| | | |
|---|---|---|
| 2019/0137804 A1 | 5/2019 | You et al. |
| 2020/0209702 A1 | 7/2020 | Qu et al. |

FOREIGN PATENT DOCUMENTS

| | | | |
|---|---|---|---|
| CN | 106773373 A | | 5/2017 |
| CN | 108375858 A | | 8/2018 |
| KR | 20190053571 | * | 11/2017 |
| KR | 20190053571 A | | 5/2019 |

* cited by examiner

PRIVACY FILM, DISPLAY APPARATUS, AND METHOD OF DISPLAYING IMAGE IN DISPLAY APPARATUS

CROSS-REFERENCE TO RELATED APPLICATION

This application is a national stage application under 35 U.S.C. § 371 of International Application No. PCT/CN2019/092044, filed Jun. 20, 2019, the contents of which are incorporated by reference in the entirety.

TECHNICAL FIELD

The present invention relates to display technology, more particularly, to a privacy film, a display apparatus, and a method of displaying an image in a display apparatus.

BACKGROUND

Display apparatuses such as mobile phones have been developed to provide many functions. A user may use a display apparatus to access various private information. For example, the user may use the display apparatus to access bank accounts, pay bills, carry out on-line purchases, and access various password-protected websites. Personal information of these types is private and is often subject to identity theft and invasion of privacy. Thus, in recent years, privacy protection has become a focus of research and development in display technology.

SUMMARY

In one aspect, the present invention provides a privacy film, comprising a first conductive layer; an emitting angle limiting spacer layer on the first conductive layer, wherein the emitting angle limiting spacer layer comprises a plurality of spacers defining a plurality of light emitting regions, a respective one of the plurality of light emitting regions is between two adjacent spacers of the plurality of spacers; a second conductive layer on a side of the emitting angle limiting spacer layer away from the first conductive layer, wherein the second conductive layer is spaced apart from the first conductive layer by a first distance; and a plurality of light diffuser particles in a space between the first conductive layer and the second conductive layer; wherein a maximum height of the plurality of spacers relative to a surface of the first conductive layer facing the second conductive layer is less than the first distance; the second conductive layer is spaced apart from a surface of a respective one of the plurality of spacers facing the second conductive layer by a second distance; and the first distance is greater than the second distance.

Optionally, in a first viewing mode, the plurality of light diffuser particles are present substantially throughout the space between the first conductive layer and the second conductive layer when a first voltage difference is provided between the first conductive layer and the second conductive layer; and light emitted out of the plurality of light emitting regions is limited in a first viewing angle range.

Optionally, in a second viewing mode, the plurality of light diffuser particles are enriched toward the first conductive layer as compared to in the first viewing mode, when a second voltage difference is provided between the first conductive layer and the second conductive layer; light emitted out of the plurality of light emitting regions is limited in a second viewing angle range; and the second viewing angle range is smaller than the first viewing angle range.

Optionally, an absolute value of the first voltage difference is smaller than an absolute value of the second voltage difference.

Optionally, in the second viewing mode, the plurality of light diffuser particles are substantially absent in at least a portion of a first space between the surface of the respective one of the plurality of spacers facing the second conductive layer and a surface of the second conductive layer facing the first conductive layer.

Optionally, in the second viewing mode, the plurality of light diffuser particles are substantially limited in a second space between the surface of the first conductive layer facing the second conductive layer and the surface of the respective one of the plurality of spacers facing the second conductive layer, and is substantially absent in an entirety of the first space between the surface of the respective one of the plurality of spacers facing the second conductive layer and a surface of the second conductive layer facing the first conductive layer.

Optionally, in the second viewing mode, the plurality of light diffuser particles are substantially absent in a portion of the second space between the surface of the first conductive layer facing the second conductive layer and the surface of the respective one of the plurality of spacers facing the second conductive layer.

Optionally, a respective one of the plurality of light diffuser particles has a diameter in a range of 5 nm to 5 μm.

Optionally, the plurality of light diffuser particles are conductive particles.

Optionally, the plurality of spacers are a plurality of light blocking spacers configured to block light from transmitting there-through.

Optionally, the plurality of night diffuser particles are substantially transparent particles.

Optionally, the plurality of spacers are a plurality of strip-shaped spacers spaced apart from each other.

Optionally, the plurality of spacers are a plurality of ring-shaped spacers comprising an inner ring-shaped spacer sequentially encircled by a series of outer ring-shaped spacers of gradually increasing diameters.

In another aspect, the present invention provides a display apparatus, comprising a display panel, a back light, and the privacy film described herein attached to a side of the display panel.

Optionally, the privacy film is between the display panel and the back light.

Optionally, the privacy film is on a light emitting side of the display panel away from the back light.

Optionally, the display apparatus further comprises a controller for adjusting a voltage difference between the first conductive layer and the second conductive layer.

In another aspect, the present invention provides a method of displaying an image in a display apparatus, comprising providing a privacy film in the display apparatus; wherein the privacy film comprise a first conductive layer; an emitting angle limiting spacer layer on the first conductive layer, wherein the emitting angle limiting spacer layer comprises a plurality of spacers defining a plurality of light emitting regions, a respective one of the plurality of light emitting regions is between two adjacent spacers of the plurality of spacers; a second conductive layer on a side of the emitting angle limiting spacer layer away from the first conductive layer, wherein the second conductive layer is spaced apart from the first conductive layer by a first distance; and a plurality of light diffuser particles in a space between the first conductive layer and the second conductive layer; wherein a maximum height of the plurality of spacers relative to a surface of the first conductive layer facing the second conductive layer is less than the first distance; the second conductive layer is spaced apart from a surface of a respective one of the plurality of spacers facing the second conductive layer by a second distance; and the first distance is greater than the second distance.

Optionally, the method further comprises controlling the privacy film in a first viewing mode by controlling a voltage difference between the first conductive layer and the second conductive layer to be in a first range; wherein, in the first viewing mode, the plurality of light diffuser particles are present substantially throughout the space between the first conductive layer and the second conductive layer, and light emitted out of the plurality of light emitting regions is limited in a first viewing angle range.

Optionally, the method further comprises controlling the privacy film in a second viewing mode by controlling the voltage difference between the first conductive layer and the second conductive layer to be in a second range; wherein, in the second viewing mode, the plurality of light diffuser particles are enriched toward the first conductive layer as compared to in the first viewing mode; light emitted out of the plurality of light emitting regions is limited in a second viewing angle range; and the second viewing angle range is smaller than the first viewing angle range.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Conventional privacy protection methods typically involves adhering a privacy film onto the surface of a display panel to reduce viewing angle. For example, a conventional privacy film may be made by incorporating liquid crystal molecules between two polymer film. The privacy protection may be realized by applying a voltage signal to the liquid crystal molecules. However, because the conventional privacy film is permanently adhered to the display panel, it severely limits the viewing angle of the display panel even when privacy is not required. For example, when a user wants to show a photo stored on a display apparatus to other people, they may have a difficult time viewing the photo due to the presence of the privacy film. Also, the conventional privacy film has a relatively large thickness, reducing brightness of the image displayed in the display apparatus. Further, the presence of the conventional privacy film lowers the reliability of the display apparatus, particularly at a relatively high temperature and/or a relatively high humidity.

Accordingly, the present disclosure provides, inter alia, a privacy film, a display apparatus, and a method of displaying an image in a display apparatus that substantially obviate one or more of the problems due to limitations and disadvantages of the related art. In one aspect, the present disclosure provides a privacy film. In some embodiments, the privacy film includes a first conductive layer; an emitting angle limiting spacer layer on the first conductive layer; a second conductive layer on a side of the emitting angle limiting spacer layer away from the first conductive layer; and a plurality of light diffuser particles in a space between the first conductive layer and the second conductive layer. Optionally, the emitting angle limiting spacer layer includes a plurality of spacers defining a plurality of light emitting regions, a respective one of the plurality of light emitting regions is between two adjacent spacers of the plurality of spacers. Optionally, the second conductive layer is spaced apart from the first conductive layer by a first distance. Optionally, a maximum height of the plurality of spacers relative to a surface of the first conductive layer facing the second conductive layer is less than the first distance. Optionally, the second conductive layer is spaced apart from a surface of a respective one of the plurality of spacers facing the second conductive layer by a second distance. Optionally, the first distance is greater than the second distance.

Figure 1:
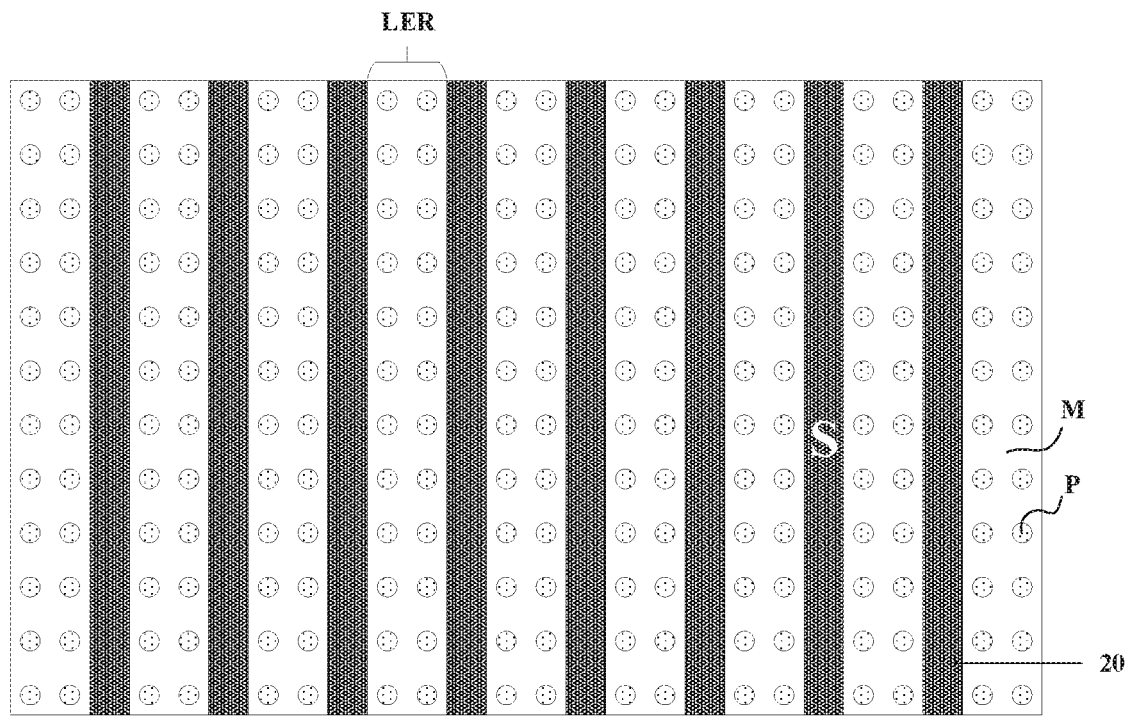
FIG. 1 is a plan view of a privacy film in some embodiments according to the present disclosure.
Figure 2:
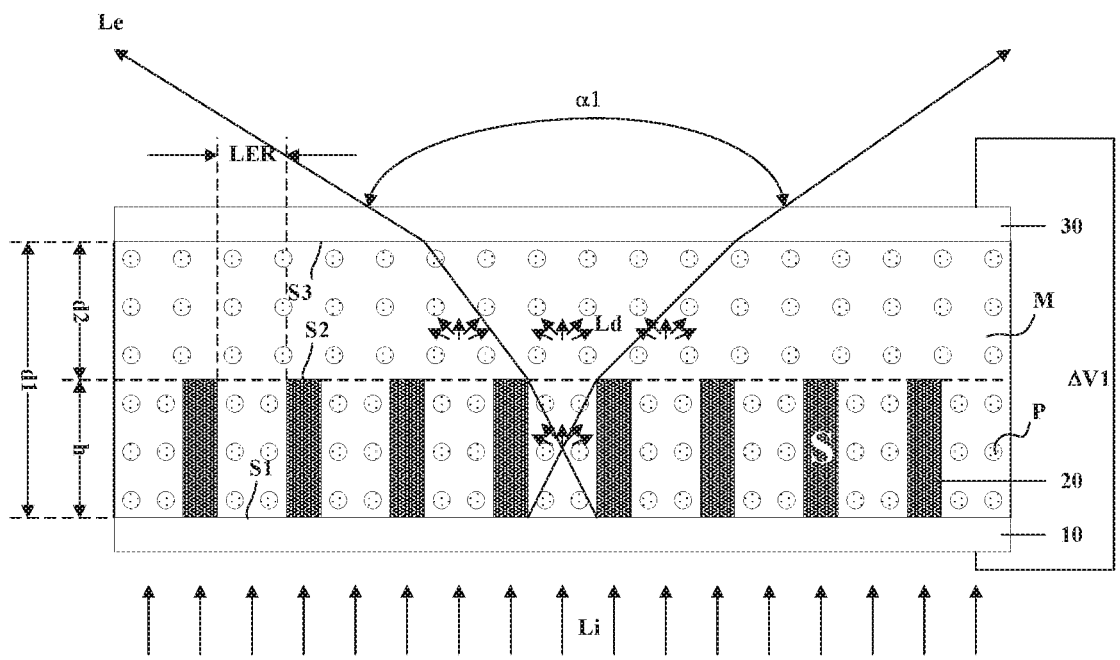
FIG. 2 is a cross-sectional view of a privacy film in some embodiments according to the present disclosure.

FIG. 1 is a plan view of a privacy film in some embodiments according to the present disclosure. FIG. 2 is a cross-sectional view of a privacy film in some embodiments according to the present disclosure. Referring to FIG. 1 and FIG. 2, the privacy film includes a first conductive layer 10; an emitting angle limiting spacer layer 20 on the first conductive layer 10; a second conductive layer 30 on a side of the emitting angle limiting spacer layer 20 away from the first conductive layer 10; and a plurality of light diffuser particles P in a space between the first conductive layer 10 and the second conductive layer 30. Optionally, the plurality of light diffuser particles P are dispersed in a medium M. Optionally, each of the plurality of light diffuser particles P is configured to diffuse light (indicated by Ld in FIG. 2). Optionally, the medium M is an insulating medium such as an optically clear insulating fluid. Examples of insulating fluids suitable for making the medium M include mineral oil, hexane, silicone oil, fluorinated insulating fluid such as Fluorinert® (Sumitomo 3M), and benzene. The plurality of light diffuser particles P are free to migrate in the space between the first conductive layer 10 and the second conductive layer 30.

Various appropriate light diffuser particles may be used for making the plurality of light diffuser particles P. Optionally, the plurality of light diffuser particles P are a plurality of charged particles. Optionally, the plurality of light diffuser particles P are a plurality of electrically chargeable particles. Optionally, the plurality of light diffuser particles P are a plurality of conductive particles including a conductive material. Optionally, the plurality of light diffuser particles P are a plurality of substantially transparent particles. As used herein, the term "substantially transparent" means at least 50 percent (e.g., at least 60 percent, at least 70 percent, at least 80 percent, at least 90 percent, and at least 95 percent) of an incident light in the visible wavelength range transmitted therethrough. Examples of appropriate materials for making the plurality of light diffuser particles P include various metal oxides such as indium oxide; tin oxide; zinc oxide; titanium oxide; indium oxide doped with one or any combination of tin, zinc, tellurium, silver, gallium, zirconium, and hafnium; tin oxide doped with one or any combination of antimony, zinc, and fluorine; zinc oxide doped with one or any combination of aluminum, gallium, boron, fluorine, and manganese; titanium oxide doped with one or any combination of niobium and tantalum. Optionally, the plurality of light diffuser particles P include indium tin oxide.

In some embodiments, a respective one of the plurality of light diffuser particles P has a diameter in a range of 5 nm to 5 μm, e.g., 5 nm to 20 nm, 20 nm to 50 nm, 50 nm to 100 nm, 100 nm to 500 nm, 500 nm to 1 μm, 1 μm to 2 μm, 2 μm to 3 μm, 3 μm to 4 μm, or 4 μm to 5 μm. Optionally, the plurality of light diffuser particles P have an average diameter in a range of 5 nm to 5 μm, e.g. 5 nm to 20 nm, 20 nm to 50 nm, 50 nm to 100 nm, 100 nm to 500 nm, 500 nm to 1 μm, 1 μm to 2 μm, 2 μm to 3 μm, 3 μm to 4 μm, or 4 μm to 5 μm.

Various appropriate conductive materials may be used for making the first conductive layer 10 and the second conductive layer 30. Optionally, the first conductive layer 10 and the second conductive layer 30 are made of a substantially transparent conductive material. Examples of appropriate conductive materials for making the first conductive layer 10 and the second conductive layer 30 include substantially transparent metallic material e.g., nano-silver) and substantially transparent metal oxides (e.g., indium tin oxide).

In some embodiments, the emitting angle limiting spacer layer 20 includes a plurality of spacers S defining a plurality of light emitting regions LER. A respective one of the plurality of light emitting regions LER is between two adjacent spacers of the plurality of spacers S. The second conductive layer 30 is on a side of the emitting angle limiting spacer layer 20 away from the first conductive layer 10.

In some embodiments, the plurality of spacers S are a plurality of light blocking spacers configured to block light from transmitting there-through. Optionally, the plurality of spacers S are light absorbing spacers that substantially absorbs light. Optionally, the plurality of spacers S are substantially non-transparent spacers. For example, the plurality of spacers S are made of a material that absorbs at least 50 percent (e.g., at least 60 percent, at least 70 percent, at least 80 percent, at least 90 percent, and at least 95 percent) of an incident light in the visible wavelength range. Various appropriate materials may be used for making the plurality of spacers S. Examples of appropriate materials for making the plurality of spacers S include black materials such as a resin material mixed with a black material (e.g., carbon black, or a black dye such as perylene black), various metal materials such as manganese (Mn), chromium (Cr), cobalt (Co) and nickel (Ni), and various metal oxide materials.

In some embodiments, the second conductive layer 30 is spaced apart from the first conductive layer 10 by a first distance d1. Optionally, a maximum height h of the plurality of spacers S relative to a surface S1 of the first conductive layer 10 facing the second conductive layer 30 is less than the first distance d1. Optionally, the second conductive layer 30 is spaced apart from a surface S2 of a respective one of the plurality of spacers S facing the second conductive layer 30 by a second distance d2. Optionally, the first distance d1 is greater than the second distance d2. Optionally, a ratio of h to d1 is in a range of 2:10 to 8:10, e.g., 2.5:10 to 7.5:10, 3:10 to 7:10, 3.5:10 to 6.5:10, 4:10 to 6:10, or 4.5:10 to 5.5:10. Optionally, a ratio of d2 to d1 is in a range of 2:10 to 8:10, e.g., 2.5:10 to 7.5:10, 3:10 to 7:10, 3.5:10 to 6.5:10, 4:10 to 6:10, or 4.5:10 to 5.5:10. Optionally, a ratio of d2 to h is in a range of 2:8 to 8:2, e.g., 2.5:7.5 to 7.5:2.5, 3:7 to 7:3, 3.5:6.5 to 6.5:3.5, 4:6 to 6:4, or 4.5:5.5 to 5.5:4.5.

Figure 3:
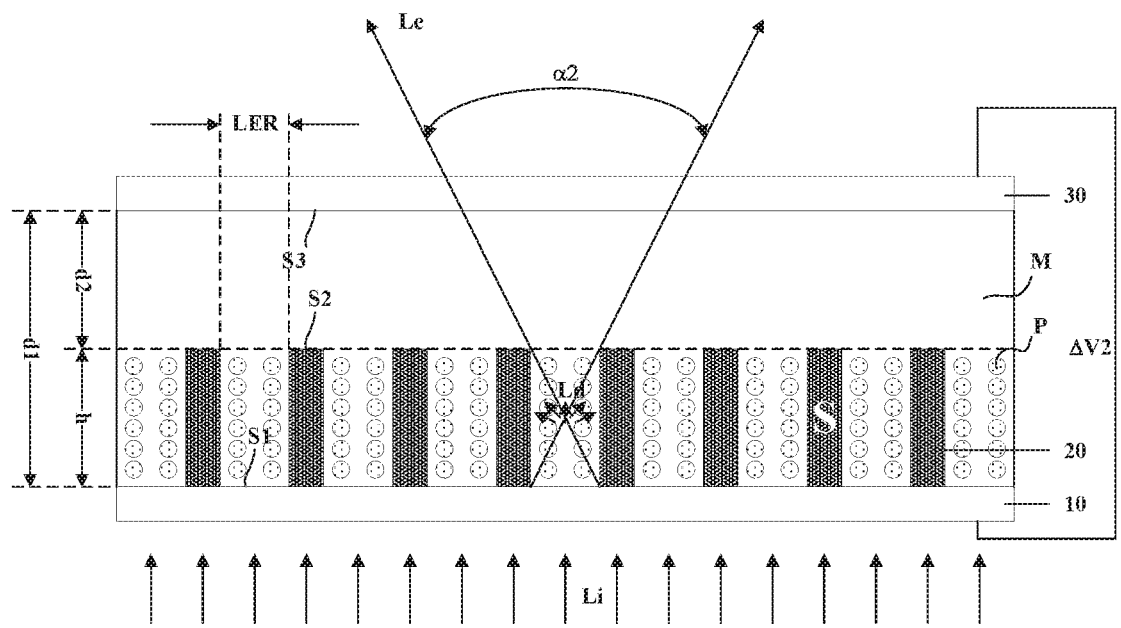
FIG. 3 is a cross-sectional view of a privacy film in some embodiments according to the present disclosure.

Referring to FIG. 2, an incident light Li emits along a direction from the first conductive layer 10 to the second conductive layer 30. FIG. 2 depicts a privacy film in a first viewing mode, in which a first voltage difference $\Delta V1$ is provided between the first conductive layer 10 and the second conductive layer 30. An exit light Le emitted out of the plurality of light emitting regions LER is limited in a first viewing angle range $\alpha 1$. FIG. 3 is a cross-sectional view of a privacy film in some embodiments according to the present disclosure. FIG. 3 depicts a privacy film in a second viewing mode, in which a second voltage difference $\Delta V2$ is provided between the first conductive layer 10 and the second conductive layer 30. An exit light Le emitted out of the plurality of light emitting regions LER is limited in a second viewing angle range $\alpha 2$. The second viewing angle range $\alpha 2$ is smaller than the first viewing angle range $\alpha 1$. Optionally, an absolute value of the first voltage difference $\Delta V1$ is smaller than an absolute value of the second voltage difference $\Delta V2$. Optionally, the first voltage difference $\Delta V1$ is substantially zero, e.g., in a range of −1V to 1 V, or 0 V. Optionally, a ratio of the absolute value of the second voltage difference $\Delta V2$ to the absolute value of the first voltage difference $\Delta V1$ is in a range of 100:1 to 1.5:1, e.g., 100:1 to 50:1, 50:1 to 10:1, or 10:1 to 1.5:1.

This is at least in part due to the plurality of light diffuser particles P. In the first viewing mode, as shown in FIG. 2, the plurality of light diffuser particles P are present substantially throughout the space between the first conductive layer 10 and the second conductive layer 30 (except for the space occupied by the plurality of spacers S). Due to the presence of the plurality of spacers S, the incident light Li emitted into the privacy film is initially limited in a smaller view angle range.

Figure 4:
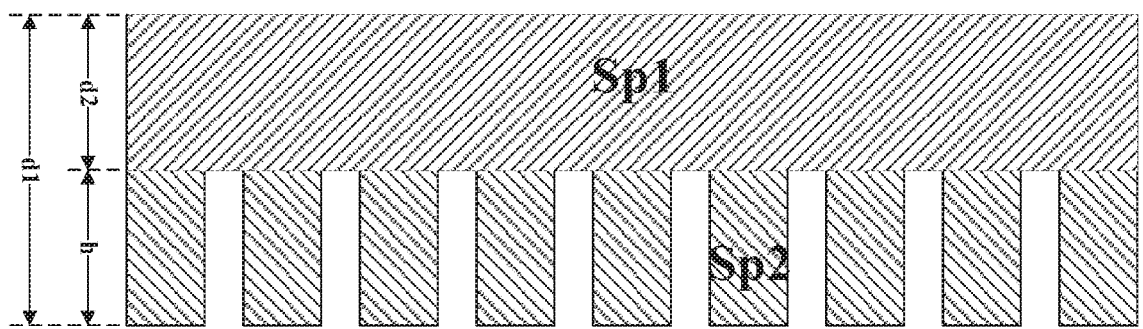
FIG. 4 illustrates a space between a first conductive layer and a second conductive layer in a privacy film in some embodiments according to the present disclosure.

FIG. 4 illustrates a space between a first conductive layer and a second conductive layer in a privacy film in some embodiments according to the present disclosure. As shown in FIG. 2 and FIG. 4, the space between the first conductive layer 10 and the second conductive layer 30 includes a first space Sp1 between the surface S2 of the respective one of the plurality of spacers S facing the second conductive layer 30 and a surface S3 of the second conductive layer 30 facing the first conductive layer 10, and a second space Sp2 between the surface S1 of the first conductive layer 10 facing the second conductive layer 30 and the surface S2 of the respective one of the plurality of spacers S facing the second conductive layer 30 (except for the space occupied by the plurality of spacers S).

In the first viewing mode, the first voltage difference $\Delta V1$ is relatively small, as a result, the plurality of light diffuser particles P are present substantially throughout the space between the first conductive layer 10 and the second conductive layer 30. As used herein, the term "substantially throughout" is not limited to a situation where the plurality of light diffuser particles P are evenly distributed in the space between the first conductive layer 10 and the second conductive layer 30, but refers to the plurality of light diffuser particles P are present in both the first space Sp1 and the second space Sp2. Optionally, a distribution density of the plurality of light diffuser particles P in the first space Sp1 and a distribution density of the plurality of light diffuser particles P in the second space Sp2 are substantially the same. As used herein, the term "substantially the same" refers to a difference between two values not exceeding 30% of a base value (e.g., one of the two values), e.g., not exceeding 25%, not exceeding 20%, not exceeding 15%, not exceeding 10%, not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, the base value.

In the second viewing mode, the absolute value of the second voltage difference $\Delta V2$ is greater than the absolute value of the first voltage difference $\Delta V1$, as a result, the plurality of light diffuser particles P migrate toward the first conductive layer 10 as compared to in the first viewing mode. For example, the plurality of light diffuser particles P are enriched toward the first conductive layer 10 as compared to in the first viewing mode. Optionally, in the second viewing mode, at least 80% (e.g., at least 85%, at least 90%, at least 95%, at least 99%, or 100%) of the plurality of light diffuser particles P is limited in the second space Sp2. Optionally, a ratio of a distribution density of the plurality of light diffuser particles P in the first space Sp1 to a distribution density of the plurality of light diffuser particles P in the second space Sp2 is less than 1.5:8.5, e.g., less than 1:9, less than 0.5:9.5, or less than 0.1:9.9.

Figure 5:
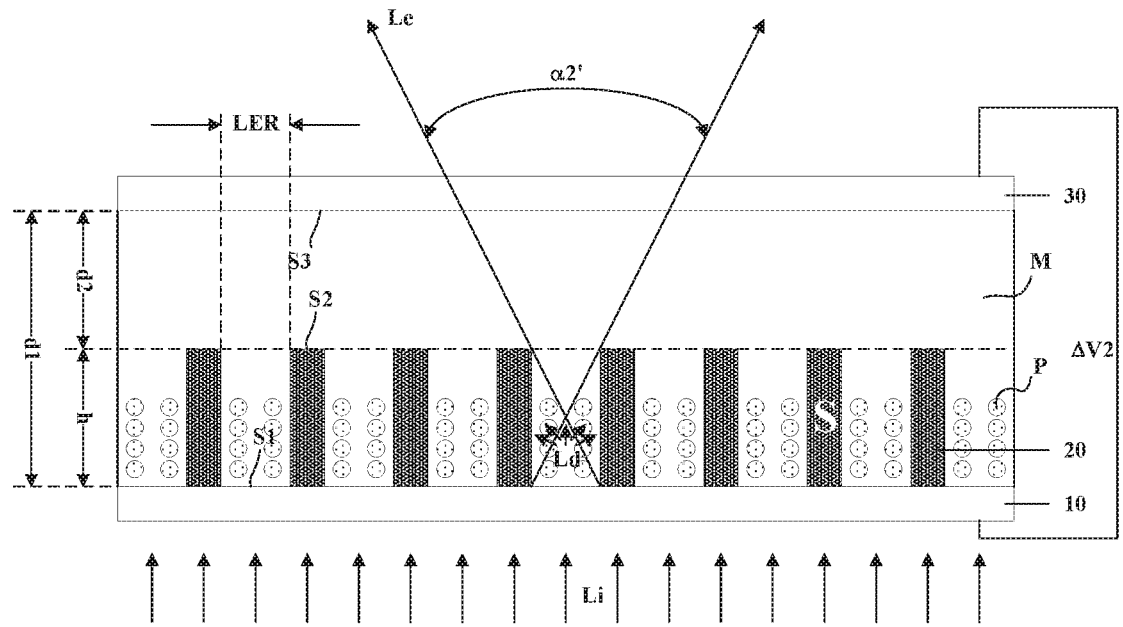
FIG. 5 is a cross-sectional view of a privacy film in some embodiments according to the present disclosure.
Figure 6:
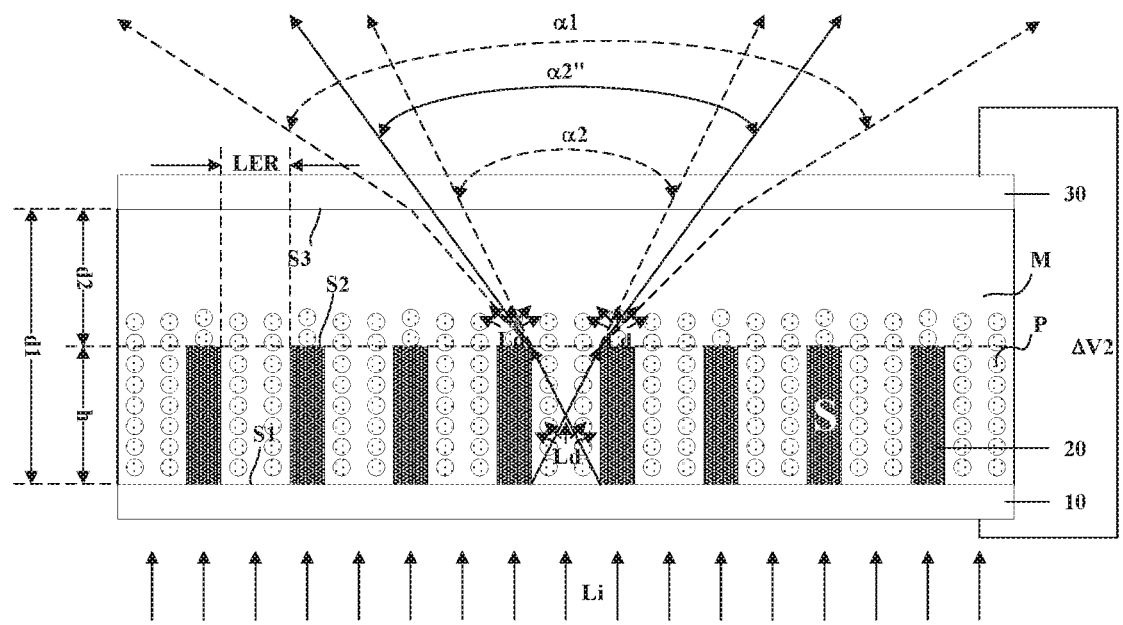
FIG. 6 is a cross-sectional view of a privacy film in some embodiments according to the present disclosure.

FIG. 5 is a cross-sectional view of a privacy film in some embodiments according to the present disclosure. FIG. 6 is a cross-sectional view of a privacy film in some embodiments according to the present disclosure. Referring to FIGS. 3, 5, and 6, in all three scenarios, in the second viewing mode, the plurality of light diffuser particles P are substantially absent in at least a portion of the first space Sp1 between the surface S2 of the respective one of the plurality of spacers facing the second conductive layer 30 and the surface S3 of the second conductive layer 30 facing the first conductive layer 10. As used herein, the term "substantially absent" refers to that virtually all, or at least 95% (e.g., at least 98%, at least 99%, or at least 99.9%) of the plurality of light diffuser particles P are removed from the portion of the first space Sp1. Optionally, as shown in FIG. 3 and FIG. 5, the plurality of light diffuser particles P are substantially absent in an entirety of the first space Sp1. Optionally, as shown in FIG. 6, the plurality of light diffuser particles P are substantially absent an upper portion of the first space Sp1.

Optionally, the second viewing mode is a private viewing mode allowing a viewer to view the image transmitted through the privacy film while not allowing a bystander to view the image because the second viewing angle range $\alpha 2$ is relatively small. Optionally, the first viewing mode is a public viewing mode allowing both the viewer and the bystander to view the image because the first viewing angle range $\alpha 1$ is relatively large.

Referring to FIG. 3 and FIG. 5, in some embodiments, in the second viewing mode, the plurality of light diffuser particles P are substantially limited in the second space Sp2 between the surface S1 of the first conductive layer 10 facing the second conductive layer 30 and the surface S2 of the respective one of the plurality of spacers S facing the second conductive layer 30, and is substantially absent in an entirety of the first space Sp1 between the surface S2 of the respective one of the plurality of spacers S facing the second conductive layer 30 and the surface S3 of the second conductive layer 30 facing the first conductive layer 10. As used herein, the term "substantially limited" refers to that virtually all, or at least 95% (e.g., at least 98%, at least 99%, or at least 99.9%) of the plurality of light diffuser particles P in the privacy film are enriched in a particular space, e.g., in the second space Sp2.

Referring to FIG. 5, in some embodiments, in the second viewing mode, the plurality of light diffuser particles P are substantially absent in an entirety of the first space Sp1 and substantially absent in a portion of the second space Sp2, for example, at least a portion of the second space Sp2 is unoccupied by the plurality of light diffuser particles P. The viewing angle range $\alpha 2'$ in FIG. 5 is substantially the same as the second viewing angle range $\alpha 2$ in FIG. 3 because the viewing angle ranges in both FIG. 3 and FIG. 5 are limited by the plurality of spacers S as the dominant factor (a critical angle). In FIG. 3, the plurality of light diffuser particles P are present in an entirety of the second space Sp2. In FIG. 5, the plurality of light diffuser particles P are enriched in a lower portion of the second space Sp2 relative to an upper portion of the second space Sp2.

Referring to FIG. 6, in some embodiments, in the second viewing mode, the plurality of light diffuser particles P are enriched in an entirety of the second space Sp2 and a portion (e.g., a lower portion) of the first space Sp1. Due to the ability of the plurality of light diffuser particles P to diffuse light (indicated by Ld in FIG. 6) and due to the presence of the light diffuser particles in the lower portion of the first space Sp1, the viewing angle range $\alpha 2''$ in FIG. 6 is greater than the second viewing angle range $\alpha 2$ in FIG. 3, greater than the viewing angle range $\alpha 2'$ in FIG. 5, but still smaller than the first viewing angle range $\alpha 1$ in FIG. 2, because the plurality of light diffuser particles P are only partially in the first space Sp1.

By adjusting the voltage difference between the first conductive layer 10 and the second conductive layer 30, various degrees of enrichment toward the second space Sp2 relative to the first space Sp1 may be achieved. Accordingly, various appropriate viewing angle ranges in the privacy film may be achieved. A user can flexibly and continuously control the viewing angle range in real time.

Figure 7:
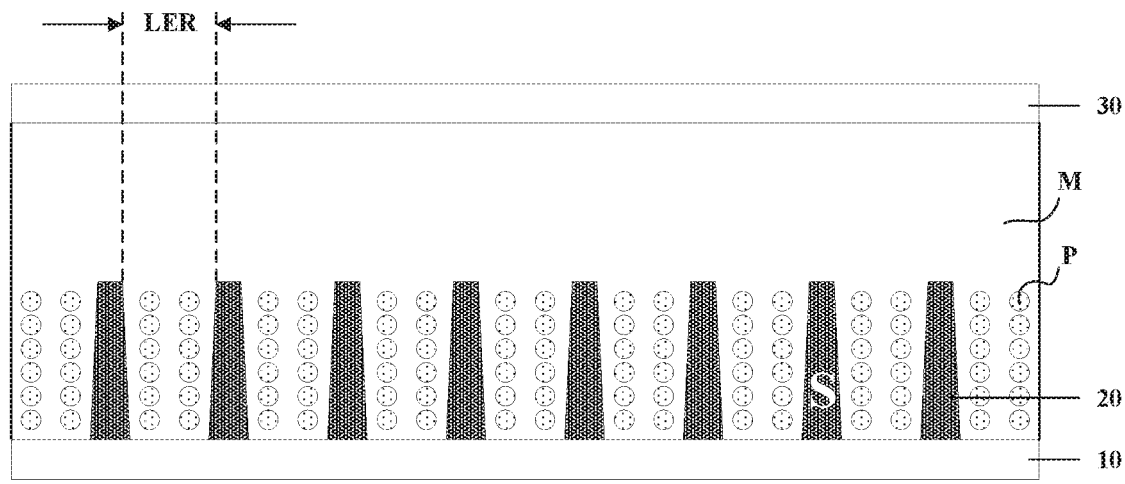
FIG. 7 is a cross-sectional view of a privacy film in some embodiments according to the present disclosure.
Figure 8:
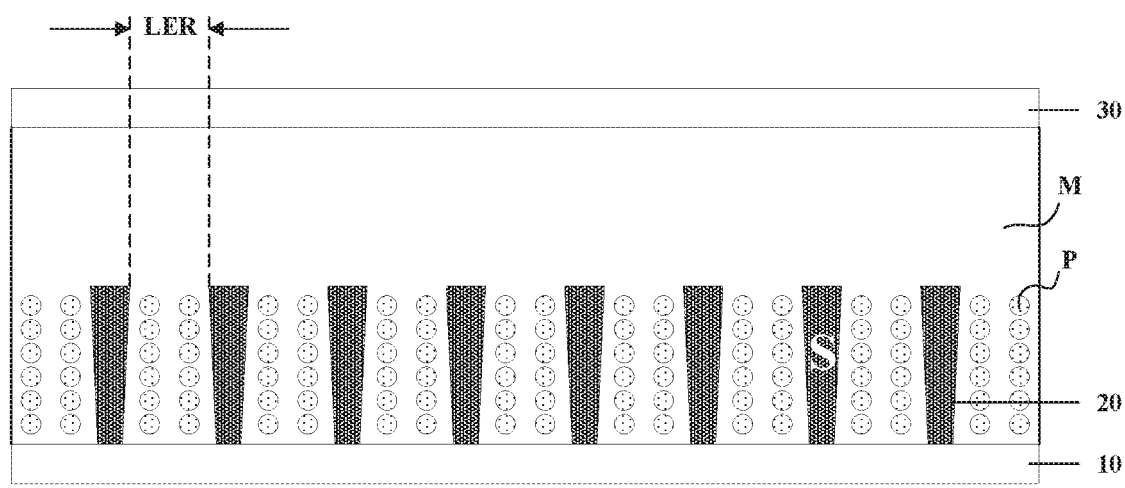
FIG. 8 is a cross-sectional view of a privacy film in some embodiments according to the present disclosure.

Various appropriate shapes may be used for the plurality of spacers S. As shown in FIG. 2, a cross-section of a respective one of the plurality of spacers S along a plane substantially perpendicular to the first conductive layer 10 and the second conductive layer 30 and intersecting the plurality of spacers S has a substantially rectangular shape. FIG. 7 is a cross-sectional view of a privacy film in some embodiments according to the present disclosure. As shown in FIG. 7, a cross-section of a respective one of the plurality of spacers S along a plane substantially perpendicular to the first conductive layer 10 and the second conductive layer 30 and intersecting the plurality of spacers S has a trapezoidal shape. FIG. 8 is a cross-sectional view of a privacy film in some embodiments according to the present disclosure. As shown in FIG. 8, a cross-section of a respective one of the plurality of spacers S along a plane substantially perpendicular to the first conductive layer 10 and the second conductive layer 30 and intersecting the plurality of spacers S has an inverted trapezoidal shape.

Figure 9:
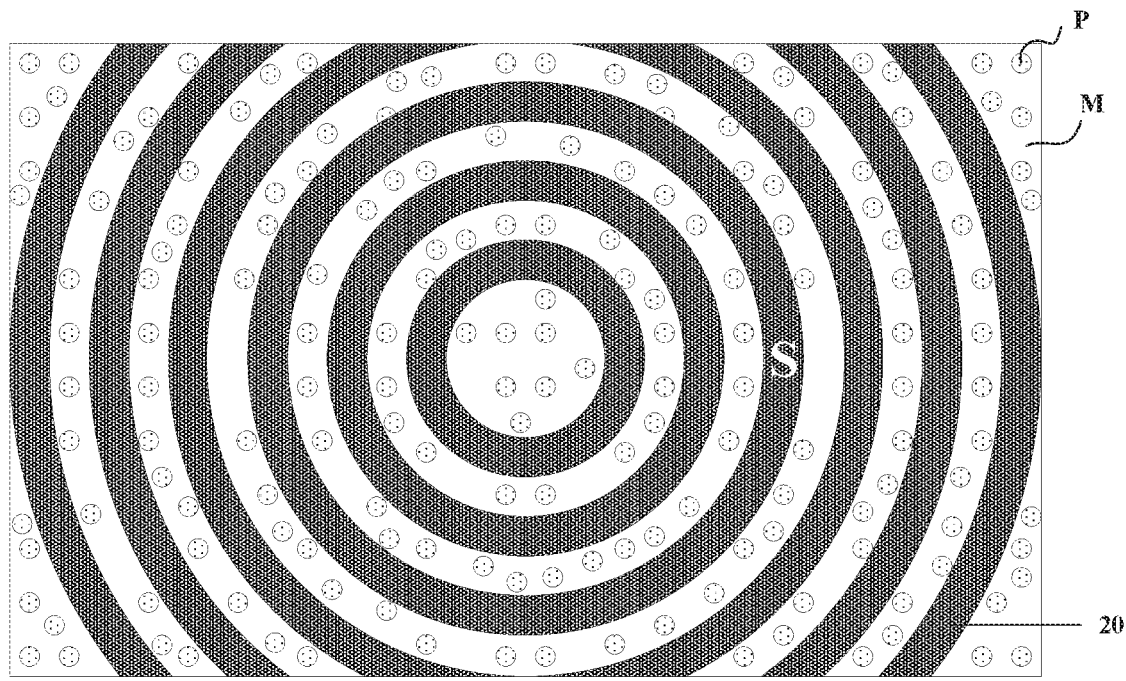
FIG. 9 is a plan view of a privacy film in some embodiments according to the present disclosure.
Figure 10:
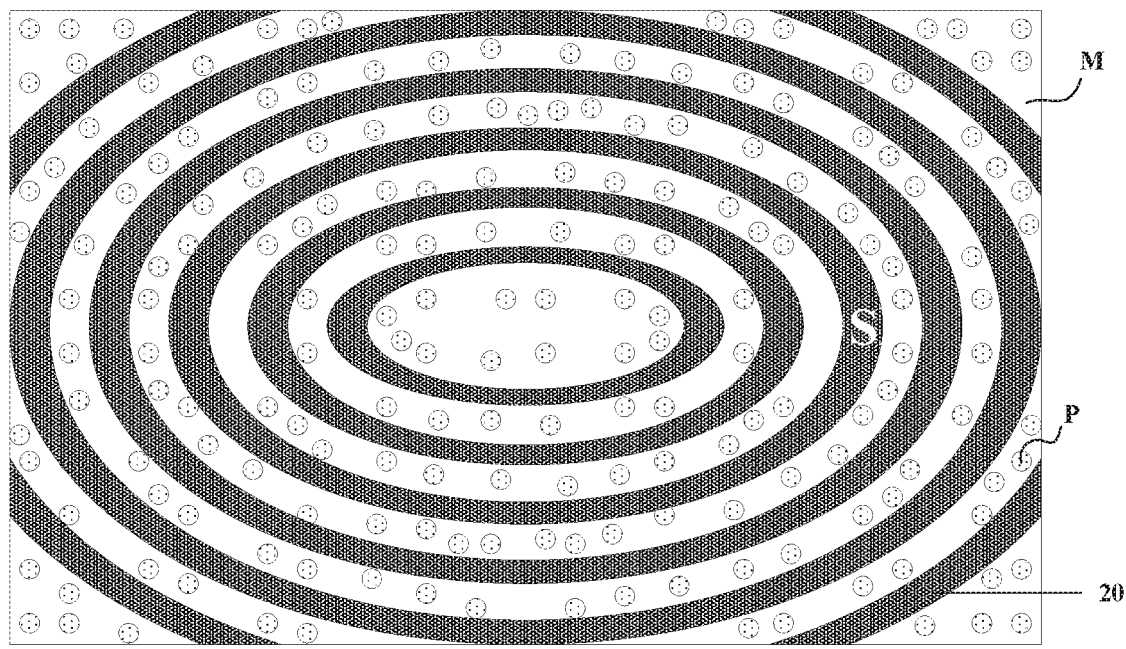
FIG. 10 is a plan view of a privacy film in some embodiments according to the present disclosure.

Various appropriate arrangements may be used for the plurality of spacers S. As shown in FIG. 1, in some embodiments, the plurality of spacers S are a plurality of strip-shaped spacers spaced apart from each other. FIG. 9 is a plan view of a privacy film in some embodiments according to the present disclosure. FIG. 10 is a plan view of a privacy film in some embodiments according to the present disclosure. Referring to FIG. 9 and FIG. 10, the plurality of spacers S are a plurality of ring-shaped spacers including an inner ring-shaped spacer sequentially encircled by a series of outer ring-shaped spacers of gradually increasing diameters. As shown in FIG. 9, a respective one of the plurality of ring-shaped spacers is a circular ring or a portion thereof. As shown in FIG. 10, a respective one of the plurality of ring-shaped spacers is an elliptical ring or a portion thereof.

In another aspect, the present disclosure provides a method of displaying an image in a display apparatus. In some embodiments, the method includes providing a privacy film in the display apparatus. The privacy film is a privacy film described herein or fabricated by a method described herein. In some embodiments, the privacy film includes a first conductive layer; an emitting angle limiting spacer layer on the first conductive layer; a second conductive layer on a side of the emitting angle limiting spacer layer away from the first conductive layer; and a plurality of light diffuser particles in a space between the first conductive layer and the second conductive layer. Optionally, the emitting angle limiting spacer layer includes a plurality of spacers defining a plurality of light emitting regions, a respective one of the plurality of light emitting regions is between two adjacent spacers of the plurality of spacers. Optionally, the second conductive layer is spaced apart from the first conductive layer by a first distance. Optionally, a maximum height of the plurality of spacers relative to a surface of the first conductive layer facing the second conductive layer is less than the first distance. Optionally, the second conductive layer is spaced apart from a surface of a respective one of the plurality of spacers facing the second conductive layer by a second distance. Optionally, the first distance is greater than the second distance.

In some embodiments, the method of displaying the image further includes controlling the privacy film in a first viewing mode by controlling a voltage difference between the first conductive layer and the second conductive layer to be in a first range. Optionally, in the first viewing mode, the plurality of light diffuser particles are present substantially throughout the space between the first conductive layer and the second conductive layer, and light emitted out of the plurality of light emitting regions is limited in a first viewing angle range.

In some embodiments, the method of displaying the image further includes controlling the privacy film in a second viewing mode by controlling the voltage difference between the first conductive layer and the second conductive layer to be in a second range. The second viewing angle range is smaller than the first viewing angle range. Optionally, in the second viewing mode, the plurality of light diffuser particles are enriched toward the first conductive layer as compared to in the first viewing mode, and light emitted out of the plurality of light emitting regions is limited in a second viewing angle range.

In some embodiments, the method of displaying the image includes continuously, in real time, adjusting the voltage difference between the first conductive layer and the second conductive layer, thereby continuously, in real time, adjusting the viewing angle range of the privacy film.

In another aspect, the present disclosure provides a method of fabricating a privacy film. In some embodiments, the method of fabricating the privacy film includes forming a first conductive layer; forming an emitting angle limiting spacer layer on the first conductive layer; forming a second conductive layer on a side of the emitting angle limiting spacer layer away from the first conductive layer; and providing a plurality of light diffuser particles in a space between the first conductive layer and the second conductive layer. Optionally, forming the emitting angle limiting spacer layer includes forming a plurality of spacers defining a plurality of light emitting regions, a respective one of the plurality of light emitting regions is between two adjacent spacers of the plurality of spacers. Optionally, the second conductive layer is formed to be spaced apart from the first conductive layer by a first distance. A maximum height of the plurality of spacers relative to a surface of the first conductive layer facing the second conductive layer is less than the first distance. Optionally, the second conductive layer is formed to be spaced apart from a surface of a respective one of the plurality of spacers facing the second conductive layer by a second distance. The first distance is greater than the second distance.

Depending on a desired viewing angle range in a private viewing mode, the viewing angle range of the privacy film may be adjusted during the fabrication process. Examples of factors that can affect the viewing angle range of the privacy film include a maximum height of the plurality of spacers relative to a surface of the first conductive layer facing the second conductive layer, a thickness of a respective one of the plurality of spacers, a concentration of the plurality of light diffuser particles in the medium, an amount of the plurality of light diffuser particles used, a volume of a first space between a surface of the respective one of the plurality of spacers facing the second conductive layer and a surface of the second conductive layer facing the first conductive layer, a volume of a second space between the surface of the first conductive layer facing the second conductive layer and the surface of the respective one of the plurality of spacers facing the second conductive layer, and a ratio of the first space to the second space, etc.

Figure 11:
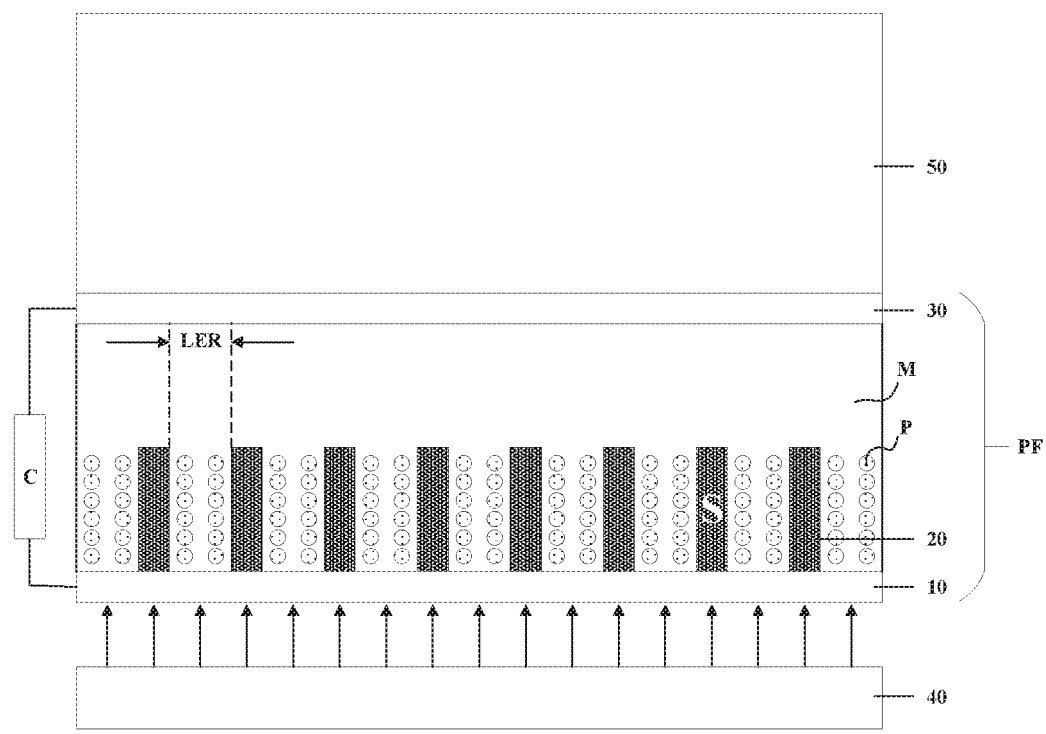
FIG. 11 is a schematic diagram of a display apparatus in some embodiments according to the present disclosure.
Figure 12:
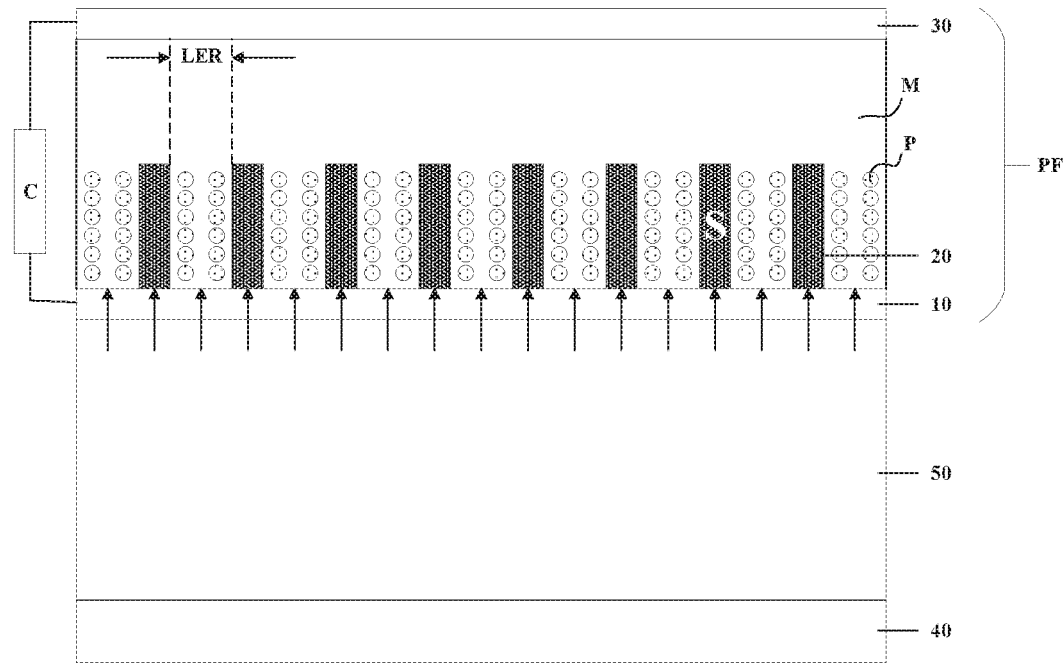
FIG. 12 is a schematic diagram of a display apparatus in some embodiments according to the present disclosure.

In another aspect, the present disclosure provides a display apparatus, FIG. 11 is a schematic diagram of a display apparatus in some embodiments according to the present disclosure. FIG. 12 is a schematic diagram of a display apparatus in some embodiments according to the present disclosure. Referring to FIG. 11 and FIG. 12, in some embodiments, the display apparatus includes the privacy film as described herein or fabricated by a method described herein, a back light 40, and a display panel 50. Optionally, the display apparatus further includes a controller C for adjusting a voltage difference between the first conductive layer 10 and the second conductive layer 30. Optionally, the controller C is configured to continuously, in real time, adjusting the voltage difference between the first conductive layer 10 and the second conductive layer 30. As shown in FIG. 11, in some embodiments, the privacy film PF is between the display panel 50 and the back light 40. As shown in FIG. 12, in some embodiments, the privacy film PF is on a light emitting side of the display panel 50 away from the back light 40.

Examples of appropriate display apparatuses include, but are not limited to, an electronic paper, a mobile phone, a tablet computer, a television, a monitor, a notebook computer, a digital album, a GPS, etc.

In another aspect, the present disclosure provides a method of fabricating a display apparatus. In some embodiments, the method of fabricating the display apparatus includes attaching the privacy film described herein or fabricated by a method described herein to a side of a display panel. Optionally, the privacy film is attached to a light emitting side of the display panel away from a back light. Optionally, the privacy film is attached to a light incident side of the display panel, and the privacy film is disposed between the display panel and the back light.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A privacy film, comprising:
a first conductive layer;
an emitting angle limiting spacer layer on the first conductive layer, wherein the emitting angle limiting spacer layer comprises a plurality of spacers defining a plurality of light emitting regions, a respective one of the plurality of light emitting regions is between two adjacent spacers of the plurality of spacers;
a second conductive layer on a side of the emitting angle limiting spacer layer away from the first conductive layer, wherein the second conductive layer is spaced apart from the first conductive layer by a first distance; and
a plurality of light diffuser particles in a space between the first conductive layer and the second conductive layer;
wherein a maximum height of the plurality of spacers relative to a surface of the first conductive layer facing the second conductive layer is less than the first distance;
the second conductive layer is spaced apart from a surface of a respective one of the plurality of spacers facing the second conductive layer by a second distance; and
the first distance is greater than the second distance;
wherein, in a first viewing mode, the plurality of light diffuser particles are present substantially throughout the space between the first conductive layer and the second conductive layer when a first voltage difference is provided between the first conductive layer and the second conductive layer; and
light emitted out of the plurality of light emitting regions is limited in a first viewing angle range;
wherein, in a second viewing mode, the plurality of light diffuser particles are enriched toward the first conductive layer as compared to in the first viewing mode, when a second voltage difference is provided between the first conductive layer and the second conductive layer;
light emitted out of the plurality of light emitting regions is limited in a second viewing angle range; and
the second viewing angle range is smaller than the first viewing angle range.

2. The privacy film of claim 1, wherein an absolute value of the first voltage difference is smaller than an absolute value of the second voltage difference.

3. The privacy film of claim 1, wherein, in the second viewing mode, the plurality of light diffuser particles are substantially absent in at least a portion of a first space between the surface of the respective one of the plurality of spacers facing the second conductive layer and a surface of the second conductive layer facing the first conductive layer.

4. The privacy film of claim 3, wherein, in the second viewing mode, the plurality of light diffuser particles are substantially limited in a second space between the surface of the first conductive layer facing the second conductive layer and the surface of the respective one of the plurality of spacers facing the second conductive layer, and is substantially absent in an entirety of the first space between the surface of the respective one of the plurality of spacers facing the second conductive layer and a surface of the second conductive layer facing the first conductive layer.

5. The privacy film of claim 4, wherein, in the second viewing mode, the plurality of light diffuser particles are substantially absent in a portion of the second space between the surface of the first conductive layer facing the second conductive layer and the surface of the respective one of the plurality of spacers facing the second conductive layer.

6. The privacy film of claim 1, wherein a respective one of the plurality of light diffuser particles has a diameter in a range of 5 nm to 5 µm.

7. The privacy film of claim 1, wherein the plurality of light diffuser particles are conductive particles.

8. The privacy film of claim 1, wherein the plurality of spacers are a plurality of light blocking spacers configured to block light from transmitting there-through.

9. The privacy film of claim 1, wherein the plurality of light diffuser particles are substantially transparent particles.

10. The privacy film of claim 1, wherein the plurality of spacers are a plurality of strip-shaped spacers spaced apart from each other.

11. A display apparatus, comprising a display panel, a back light, and the privacy film of claim 1 attached to a side of the display panel.

12. The display apparatus of claim 11, wherein the privacy film is between the display panel and the back light.

13. The display apparatus of claim 11, wherein the privacy film is on a light emitting side of the display panel away from the back light.

14. The display apparatus of claim 11, further comprising a controller for adjusting a voltage difference between the first conductive layer and the second conductive layer.

15. A privacy film, comprising:
a first conductive layer;
an emitting angle limiting spacer layer on the first conductive layer, wherein the emitting angle limiting spacer layer comprises a plurality of spacers defining a plurality of light emitting regions, a respective one of the plurality of light emitting regions is between two adjacent spacers of the plurality of spacers;
a second conductive layer on a side of the emitting angle limiting spacer layer away from the first conductive layer, wherein the second conductive layer is spaced apart from the first conductive layer by a first distance; and
a plurality of light diffuser particles in a space between the first conductive layer and the second conductive layer;
wherein a maximum height of the plurality of spacers relative to a surface of the first conductive layer facing the second conductive layer is less than the first distance;
the second conductive layer is spaced apart from a surface of a respective one of the plurality of spacers facing the second conductive layer by a second distance; and
the first distance is greater than the second distance;
wherein the plurality of spacers are a plurality of ring-shaped spacers comprising an inner ring-shaped spacer sequentially encircled by a series of outer ring-shaped spacers of gradually increasing diameters.

* * * * *